US011061458B2

(12) United States Patent
Krueger et al.

(10) Patent No.: US 11,061,458 B2
(45) Date of Patent: Jul. 13, 2021

(54) VARIABLE REDUNDANCY DATA CENTER POWER TOPOLOGY

(71) Applicant: Microsoft Technology Licensing, LLC, Redmond, WA (US)

(72) Inventors: Keith A. Krueger, Monroe, WA (US); Lalu Vannankandy Kunnath, Snoqualmie, WA (US); Kristofer Andrew Johnson, Snoqualmie, WA (US); Mark Joseph Baracani, Sammamish, WA (US); Scott Thomas Seaton, Kirkland, WA (US); Osvaldo Patricio Morales, Normandy Park, WA (US); Steven Solomon, Kirkland, WA (US); David Thomas Gauthier, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

(21) Appl. No.: 16/355,434

(22) Filed: Mar. 15, 2019

(65) Prior Publication Data

US 2020/0293101 A1    Sep. 17, 2020

(51) Int. Cl.
*G06F 1/00* (2006.01)
*G06F 1/30* (2006.01)
*G06F 1/26* (2006.01)
*H02J 9/06* (2006.01)

(52) U.S. Cl.
CPC ............... *G06F 1/30* (2013.01); *G06F 1/263* (2013.01); *H02J 9/06* (2013.01)

(58) Field of Classification Search
CPC ........ G06F 1/30; G06F 1/263; G06F 11/2015; H02J 9/06
See application file for complete search history.

(56) References Cited

U.S. PATENT DOCUMENTS

| 9,590,404 | B2 | 3/2017 | Bailey et al. |
| 2005/0071092 | A1 | 3/2005 | Farkas et al. |
| 2012/0181869 | A1* | 7/2012 | Chapel .................. G06F 1/3287 307/64 |
| 2012/0242151 | A1 | 9/2012 | Seaton et al. |
| 2017/0126445 | A1* | 5/2017 | Hamouda ................ H04B 7/04 |

OTHER PUBLICATIONS

"International Search Report and Written Opinion Issued in PCT Application No. PCT/US20/015756", dated Apr. 29, 2020, 13 Pages.

* cited by examiner

*Primary Examiner* — Xuxing Chen
(74) *Attorney, Agent, or Firm* — Davin Chin; Chin IP, PLLC

(57) ABSTRACT

A first power train that includes a first plurality of components, and a second power train includes a second plurality of components. The first power train is configured to provide power to a first plurality of server racks of a first data center at a first level of high-availability service associated with a first uptime. The first plurality of components includes a first subset of the first plurality of components and a second subset of the first plurality of components. The second power train is configured to provide power to a second plurality of server racks of the first data center at a second level of high-availability service that is associated with a second uptime that is less than the first uptime. The second plurality of components includes a first subset of the second plurality of components and the second subset of the first plurality of components.

20 Claims, 8 Drawing Sheets

VARIABLE REDUNDANCY DATA CENTER POWER TOPOLOGY

BACKGROUND

The recent rise of online services has led a significant increase in the development, expansion, and improvement of data centers and similar technologies. Such data centers may be used, for example, to provide cloud computing services, facilitate popular social media services, or to provide infrastructure for e-commerce and other web sites.

A typical modern data center may include thousands, tens of thousands, hundreds of thousands, or more servers or other computing devices. A data center may also include supporting equipment such as switches, routers, input/output equipment, temperature management equipment, and/or the like. A data center also typically includes equipment for powering the computing devices and the supporting equipment.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to data center power topologies. In one example of the technology, an apparatus includes a first power train and a second power train. In some examples, the first power train includes a first plurality of components. In some examples, the first power train is configured to provide power to a first plurality of server racks of a first data center at a first level of high-availability service associated with a first uptime. In some examples, the first plurality of components includes a first subset of the first plurality of components and a second subset of the first plurality of components. In some examples, the second power train includes a second plurality of components. In some examples, the second power train is configured to provide power to a second plurality of server racks of the first data center at a second level of high-availability service that is associated with a second uptime. In some examples, the first uptime is greater than the second uptime. In some examples, the second plurality of components includes a first subset of the second plurality of components and a second subset of the second plurality of components. In some examples, the second subset of the first plurality of components is the second subset of the second plurality of components.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
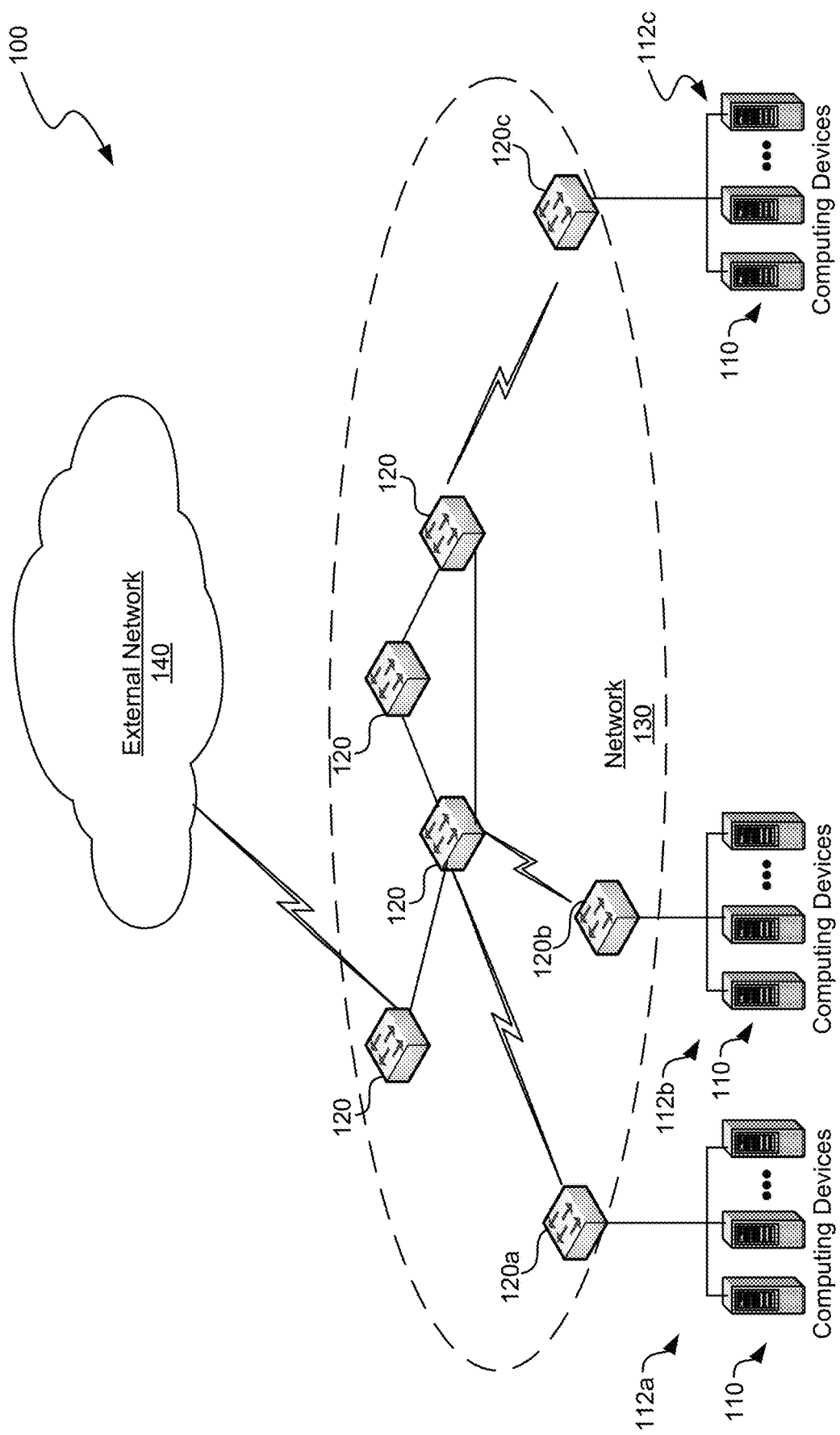
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed data center power topologies. In one example of the technology, an apparatus includes a first power train and a second power train. In some examples, the first power train includes a first plurality of components. In some examples, the first power train is configured to provide power to a first plurality of server racks of a first data center at a first level of high-availability service associated with a first uptime. In some examples, the first plurality of components includes a first subset of the first plurality of components and a second subset of the first plurality of components. In some examples, the second power train includes a second plurality of components. In some examples, the second power train is configured to provide power to a second plurality of server racks of the first data center at a second level of high-availability service that is associated with a second uptime. In some examples, the first uptime is greater than the second uptime. In some examples, the second plurality of components includes a first subset of the second plurality of components and a second subset of the second plurality of components. In some examples, the second subset of the first plurality of components is the second subset of the second plurality of components.

In some examples, power may be provided in one data center with high availability, with different levels of availability service for different loads in the same data center. Availability is generally defined as percentage uptime for a year. 99.9% uptime per year may be referred to as 3×9 (8.77 hours of downtime per year), 99.99% uptime per year may be referred to as 4×9 (52.60 minutes of downtime per year), and 99.999% may be referred to as 5×9 (5.26 minutes of downtime per year). In some examples, power may be provided at a data center with 5×9 availability for some servers in the data center, 4×9 availability for other servers in the data center, and 3×9 availability for yet other servers in the data center.

The power for the data center loads may be provided by two or more different topologies, one for each level of availability service, where the different topologies have components in common with each other. For instance, in some examples, there is one topology for 5×9 loads, another topology for 4×9 loads, and another topology for 3×9 loads, all in the same data center, in which three different share components with each other. For example, the topology for the 5×9 loads may share some components with the topology for the 4×9 loads, the topology for the 3×9 loads may share some component with the topology with the 4×9 loads, and the topologies for all three loads may share some components with each other.

Also, in some examples, the power from each of the different topologies is selectively consumed on the downstream side by at least some of the loads.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices no may be virtually any type of general- or specific-purpose computing device. For example, these computing devices may be user devices such as desktop computers, laptop computers, tablet computers, display devices, cameras, printers, or smartphones.

Various examples of the disclosure are employed in a data center environment. In a data center environment, computing devices 110 may be server devices such as application server computers, virtual computing host computers, or file server computers. Moreover, computing devices 110 may be individually configured to provide computing, storage, and/or other suitable computing services.

Illustrative System

Figure 2:
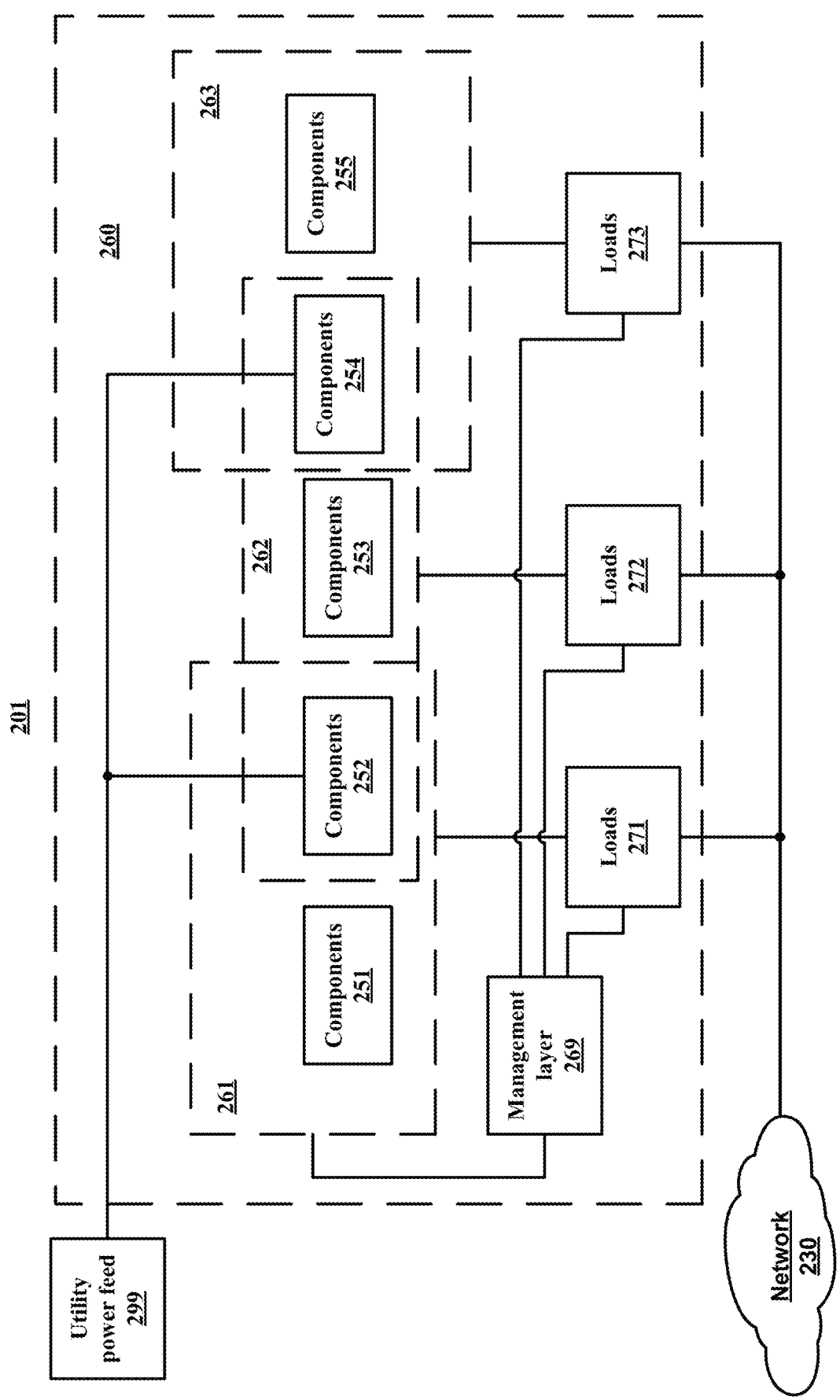
FIG. 2 is a block diagram illustrating one example of an apparatus for a data center.

FIG. 2 is a block diagram of an example system 201. System 201 may include data center 260, network 230, and utility power feed 299. Data center 260 may include availability path 261, availability path 262, availability path 263, management layer 269, loads 271, loads 272, and loads 273. Availability path 261 may include components 251 and components 252. Availability path 262 may include components 252, components 253, and components 254. Availability path 263 may include component 254 and components 255.

In some examples, availability paths 261, 262, and 263 are arranged to receive utility power from utility power feed 299. In some examples, availability path 261 is arranged to provide power to loads 271, availability path 262 is arranged to provide power to loads 272, and availability path 263 is arranged to provide power to loads 273. In some examples, some loads may be powered in a selectable manner, being driven by a selected one of the availability paths based on existing availability requirements. In some examples, the loads (271-273) may include servers racks that includes servers. In some examples, the loads (271-273) are connected to network 230 for network communication.

In some examples, management layer 269 is configured to perform various management functions, such is determining how much load is being consumed by each of the availability paths 261-263, controlling transfer of loads to the backup generator if an outage is detected in utility power, performing workload managements functions including shedding and returning loads, management and control of switches including static switches and automatic transfer switches, opening and closing circuit breakers, and/or the like. In some examples, the management layer may include power meters, an electrical power monitoring system, or the like, so that management layer 269 receives information about power flowing through various parts of data center 260. In some examples, management layer 269 may communicate with network 230, and may perform notification or signaling into software, fabric controllers, and/or cloud services.

Some examples, management layer 269 may perform functions associated with power capping, workload management, and the control planes that run servers in the loads in conjunction with communication over network 230. In some examples in which there are loads that have selected availability, management layer 269 may determine an availability service level for a load and perform control so that the load is driven in accordance with the determine availability service level, as discussed in greater detail below.

Management layer 269 may also receive and use information such as customer demand, expected customer demand, power grid information such as power levels and power prices, and/or the like.

As shown in FIG. 2, availability path 261 and availability path 262 have components in common with each other in some examples. Similarly, availability path 262 and availability path 263 have components in common with each other in some examples. Although not shown in FIG. 2, in some examples, all three availability paths 261, 262, and 263 have components in common with each other in some examples. In this way, in some examples, different availability topologies are grouped together into one datacenter in an efficient and cost-effective manner.

Availability paths may be different in some components due to differences in the provided availability, while still having some components in common. For instance, some availability paths may include a backup generator in order to provide greater availability, while other paths do not use a backup generator. Some availability paths may use dual corded servers with two PDUs in order to provide greater availability, while other availability paths use single-corded servers with one PDU. Some availability paths may use distributed redundancy to provide alternate power sources under light loads conditions, while other availability paths do not.

In some examples, availability path 261 is a 3×9 availability path, availability path 262 is a 4×9 availability path, and availability path 263 is a 5×9 availability path. In some examples, availability path 261 achieves 3×9 availability by using uninterruptible power supplies (UPSs), and using no backup generator, but rather running on battery only in the event of an outage. In some examples, availability path 262 uses the aspects of availability path 262 that increase availability, and has still further availability using a backup generator and distributed redundancy with alternate sources under light load conditions. In some examples, loads can be changed during maintenance to an alternate source, or, responsive to an outage or failure occurring in one cell connected to one bus, power can be switched another bus that has a cell with an alternate source.

In some examples, availability path 263 uses the aspects of availability path 262 that increase availability, and has still further availability using dual corded servers with each server rack in the load being connected to two PDUs and two sets of busways and dual power supplies in the racks.

In some examples, availability paths that use a backup generator have limited capacity relative what utility power feed 299 could otherwise provide, because utility power feed 299 provides more capacity than the backup generator, but the backup generator must be able to backup the entire load in order to achieve the availability of the path the greatest availability. In some examples, availability path 262 and availability path 263 make use of a backup generator, but availability path 261 does not. In this way, in some examples, the extra capacity of utility power feed 299 beyond the capacity of the backup generator can be assigned to availability path 261.

In some examples, by making use of this extra capacity, and using common components in the availability paths, different availability can be efficiently and cost-effectively provided in the same data center. In some examples, this also allows different service availabilities to be provide for different loads while correctly providing for capacity forecasting and carrying costs in a way that may otherwise be problematic if the different availability loads were driven by entirely separate topologies.

As discussed above, in some examples, different availability service levels may be provided in selectable manner. In some examples, portions of data center 260 may be composable in a late stage of construction, by making connections to compose the availability via small construction changes such as re-wiring one circuit panel to another circuit panel.

In some examples, assignment or reassignment of availability service levels can occur after construction. The assignment or reassignment of availability service levels after construction may be accomplished in different ways in different examples. For instance, in some examples, data center 260 may include at least one physical power panel or power distribution unit (PDU) that takes power sources from each of the availability paths, and allow the power to be selectively consumed by the loads. Also, in some examples, busways may be used, and a dynamic switching device including circuit breakers, automatic transfer switches, static switches, and/or the like may be used to aggregate and manage which availability paths are feeding downstream loads.

In some examples, the racks and the PDUs and the distribution of the racks may be part of the selection, where the racks themselves have intelligence that may used in the selection. In various examples, the selection may be made at the PDU level, at the server rack busway level, or inside the server rack itself. In some examples, the server rack may be connected, for example via PDUs, power panels, and/or busways to the availability paths or to dynamic switching devices. Using the selection may prevent the need for maintaining an inventory of different availabilities and systems.

Although FIG. 2 shows an example of data center 260 that includes three availability paths, some examples include two availability paths, and some examples include four or more availability paths. An example of data center 260 with two availability paths rather than three is discussed in greater detail below with regard to FIG. 4.

Figure 3A:
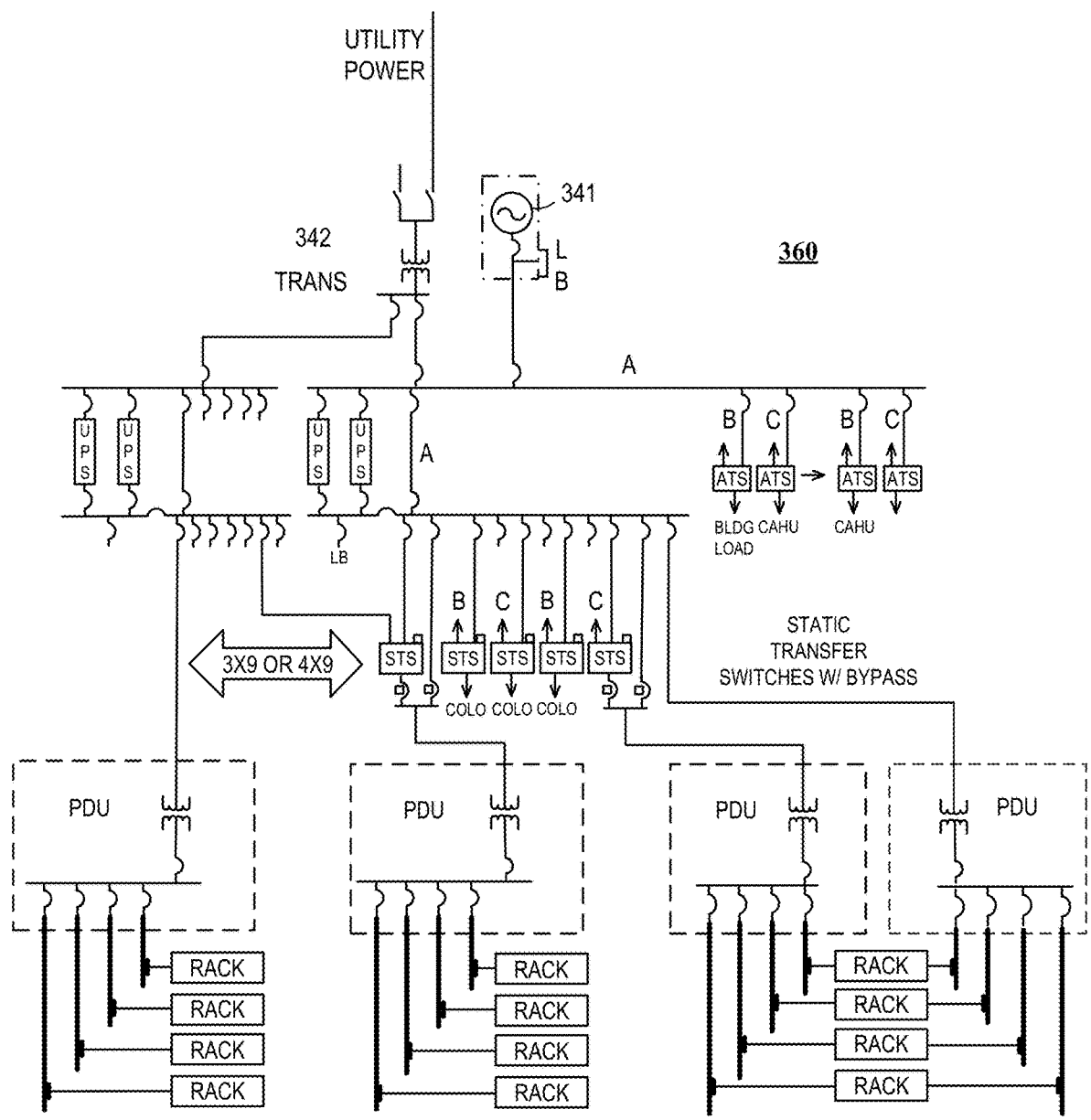
FIGS. 3A-3C are a block diagram illustrating an example of the apparatus of FIG. 2.
Figure 3B:
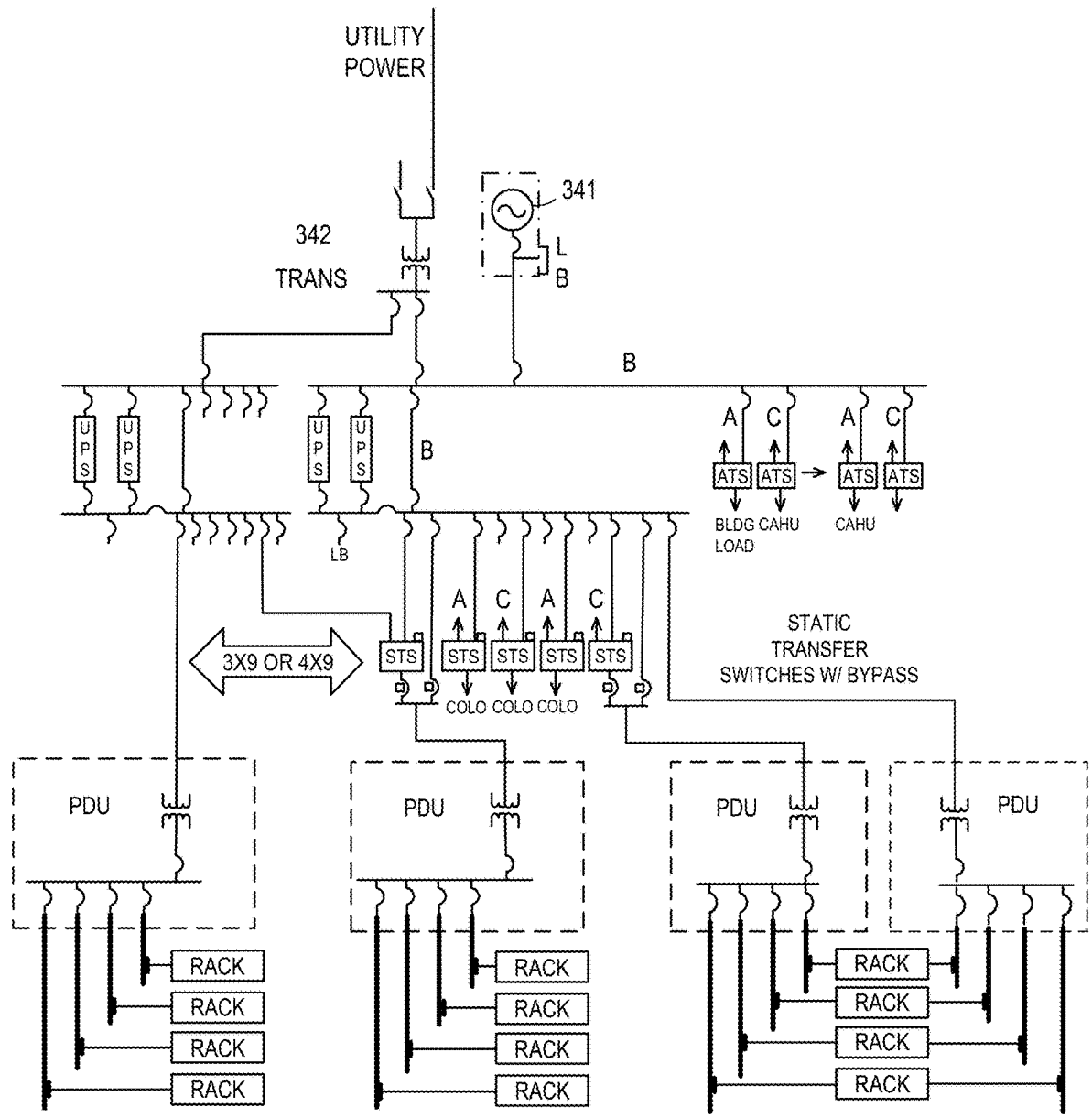
Figure 3C:
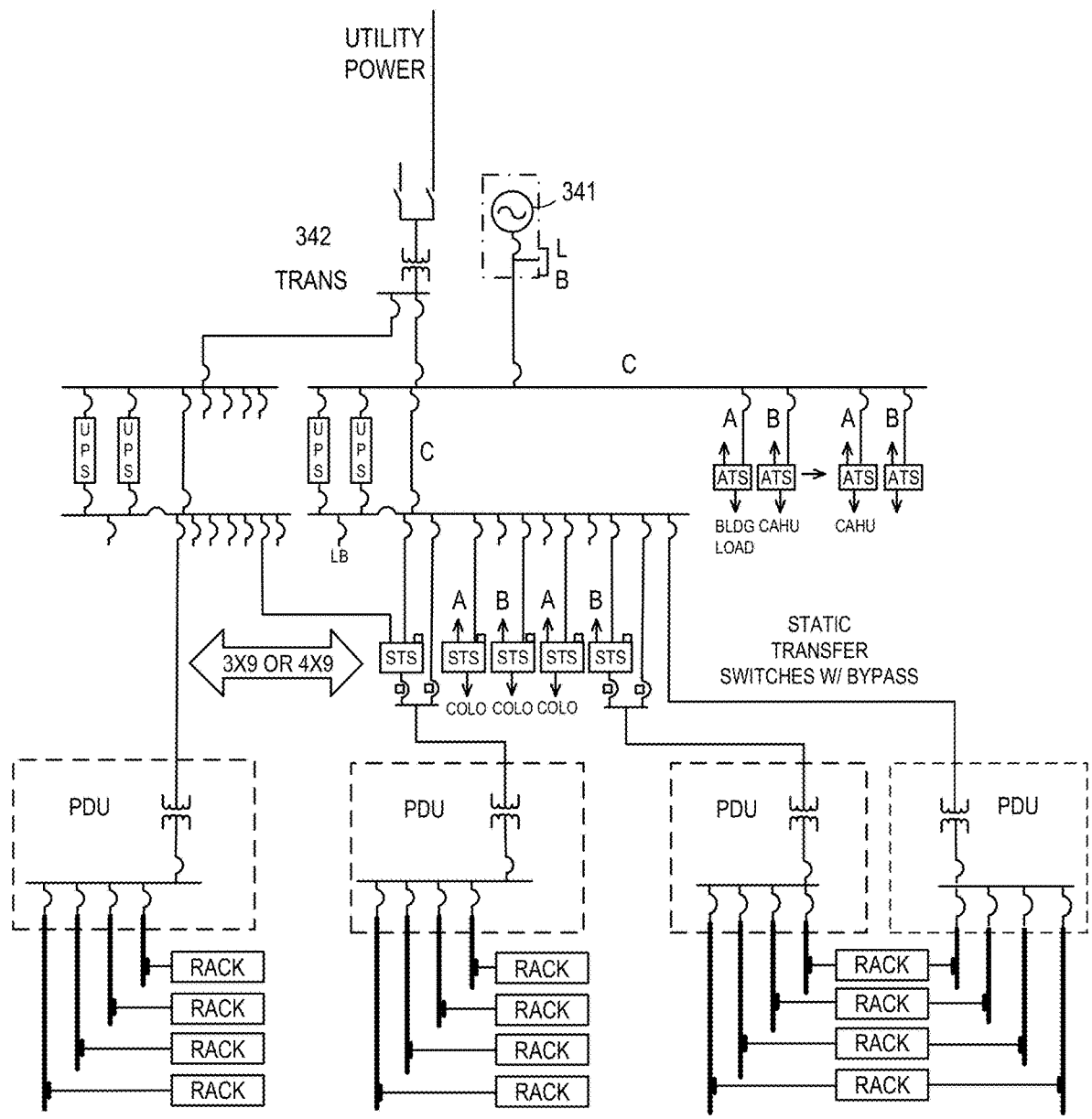

FIGS. 3A-3C are a block diagram illustrating an example of system 301, which may be employed as an example of system 201 FIG. 2. System 301 includes data center 360, which may include cell A, cell B, and Cell C. Each cell (A-C) may include backup generator 341, transformer 342, uninterruptible power supplies UPS, automatic transfer switches ATS, static transfer switches STS, power distribution units PDU, and server racks RACK.

In some examples, backup generator 341 is arranged to provide backup power for 4×9 and 5×9 loads in the event of loss of utility power. In some examples, logic in the management layer monitors the incoming power, and sends a start signal to backup generator 341 if an outage is detected, causing a transfer of the 4×9 and 5×9 loads to backup generator power. In some examples, the 3×95 are configured to run on battery power in the event of a utility power outage, and the 3×9 loads will drop if utility power has not returned by the time the batteries run out. In some examples, the topology for the 5×9 loads and the topology for powering the 4×9 loads share the backup generator and corresponding control as common components.

In some examples, transformer 342 is arranged to step down utility power, which may be medium voltage electrical campus distribution in some examples, into a lower voltage three-phase power. In some examples, static switches STS are high-speed components that transfer the loads from one source to another without ever connecting the two sources together and without dropping the load, so that no interruption is experienced by the load.

In some examples, the three-phase power goes through the static switches ready to make a transfer is necessary. In some examples, if a fault condition is detected, such as an undervoltage condition, an out-of-frequency condition, other power disturbance, or the like, the loads will transfer to an alternate bus to one of the other cells (e.g., from cell A to cell B). The use of cells A, B, and C with switching provided by static switches STS is an example of distributed redundancy. In some examples, the topology for powering the 5×9 loads and the topology for powering the 4×9 loads share the distributed redundancy as components in common.

In some examples, ATSs move mechanical and building loads to an alternate bus for an alternate cell in the event of an outage. In some examples, the PDUs each include a transformer to transform the 480V signal to a 240V signal that the loads run at. In some examples, the PDUs for the 3×9 loads and the 4×9 loads each use one busway for proving power to the loads in a single-corded topology. In some examples, for the 5×9 RACK loads, there are two PDUs, two sets of busways, and dual power supplies in RACKs. In some examples, the two PDUs, two sets of busways, and dual power supplies in RACKs act as components of the topology for powering the 5×9 loads that is not shared by the topology for powering the 4×9 loads or the 3×9 loads.

In some examples, UPSs act as common components for the topology powering the 3×9 loads, the topology powering the 4×9 loads, and the topology powering the 5×9 loads. In and examples, the UPS and battery functionality may exist in the servers or server racks.

In some examples, the topologies for providing power to a 5×9 load, 4×9 load, or 3×9 load is selectable at the time of final installation, but remains fixed thereafter. In this way, in these examples, the equipment is designed to select from availability paths, with loads selected at the time of installation. In some examples, rather than loads being fixed at the time of installation, additional switching is included in data center 360 such that the loads can be dynamically assigned or re-assigned on the fly, after installation, to be provided power as 5×9 loads, 4×9 loads, or 3×9 loads.

Figure 4:
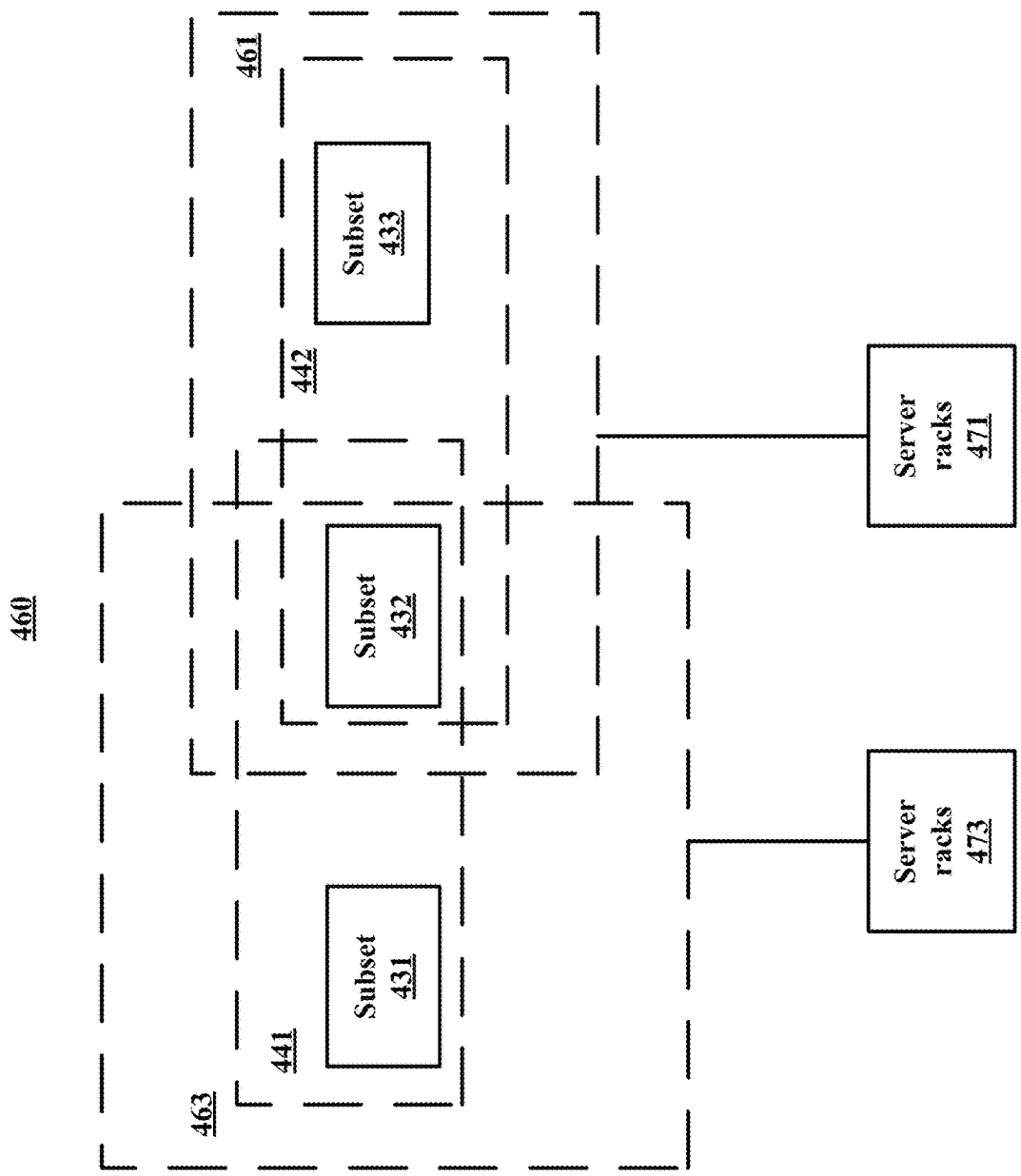
FIG. 4 is a block diagram illustrating another example of an apparatus for a data center.

FIG. 4 is a block diagram illustrating an example of data center 460. Data center 460 may include first power train 463 and second power train 461. First power train 463 may include first plurality of components 441. In some examples, first power train 463 is configured to provide power to a first plurality of server racks 473 of first data center 460 at a first level of high-availability service associated with a first uptime. First plurality of components 441 may include first subset 431 of first plurality of components 441 and second subset 432 of first plurality of components 441. Second power train 461 may include second plurality of components 442. In some examples, second power train 461 is configured to provide power to second plurality of server racks 471 of data center 460 at a second level of high-availability service that is associated with a second uptime. In some examples, the first uptime is greater than the second uptime. Second plurality of components 442 may include first subset 433 of second plurality of components 442 and second subset 431 of second plurality of components 442, where second subset 431 of first plurality of components 441 is second subset 431 of second plurality of components 442.

Figure 5:
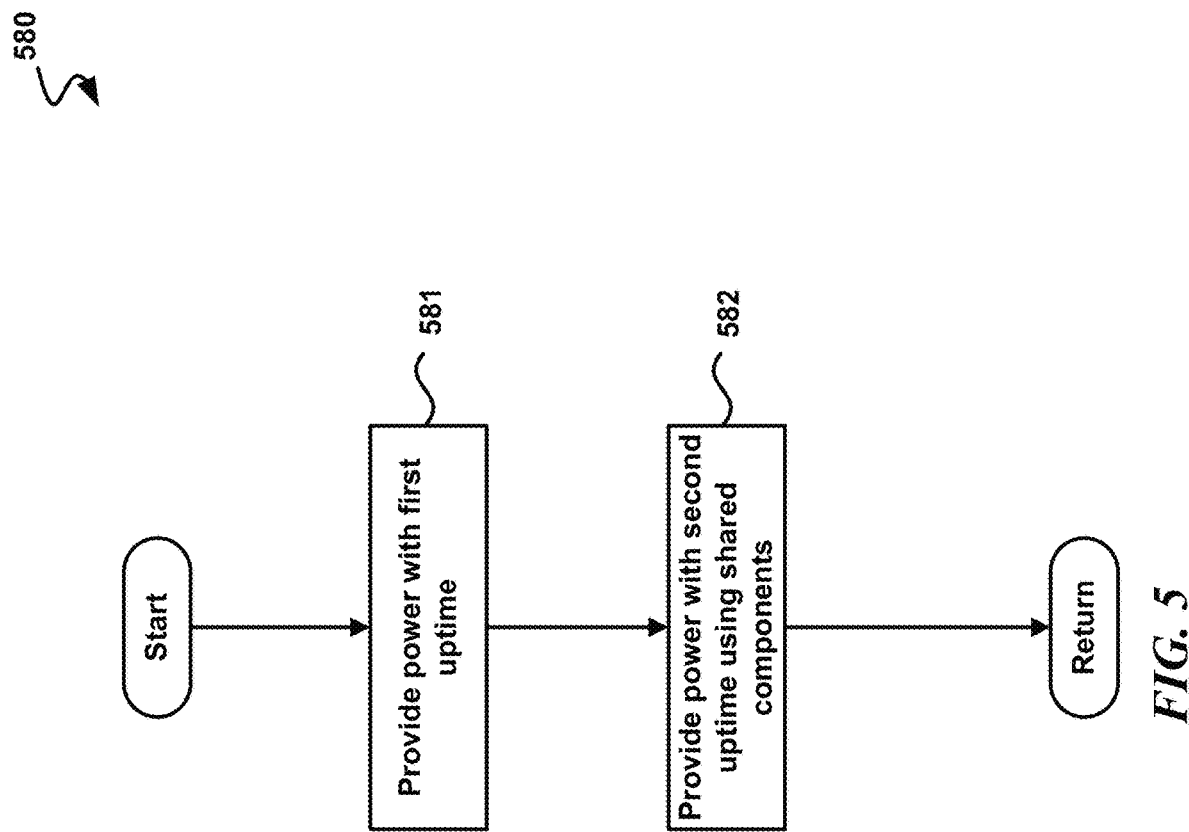
FIG. 5 is a flow diagram illustrating an example of a process.

FIG. 5 is a flow diagram illustrating an example of a process (580).

In the illustrated example, step 581 occurs first. At step 581, in some examples, a first power train is employed to provide power to a first plurality of server racks of a first data center at a first level of high-availability service associated with a first uptime. In some examples, a first power train includes a first plurality of components. In some examples, the first plurality of components includes a first subset of the first plurality of components and a second subset of the first plurality of components.

As shown, step 582 occurs next in some examples. At step 582, in some examples, a second power train is employed to provide power to a second plurality of server racks of the first data center at a second level of high-availability service that is associated with a second uptime. In some examples, the second power train includes a second plurality of components. In some examples, the first uptime is greater than the second uptime. In some examples, the second plurality of components includes a first subset of the second plurality of components and a second subset of the second plurality of components. In some examples, the second subset of the first plurality of components is the second subset of the second plurality of components.

The process may then proceed to the return block, where other processing is resumed.

Illustrative Computing Device

Figure 6:
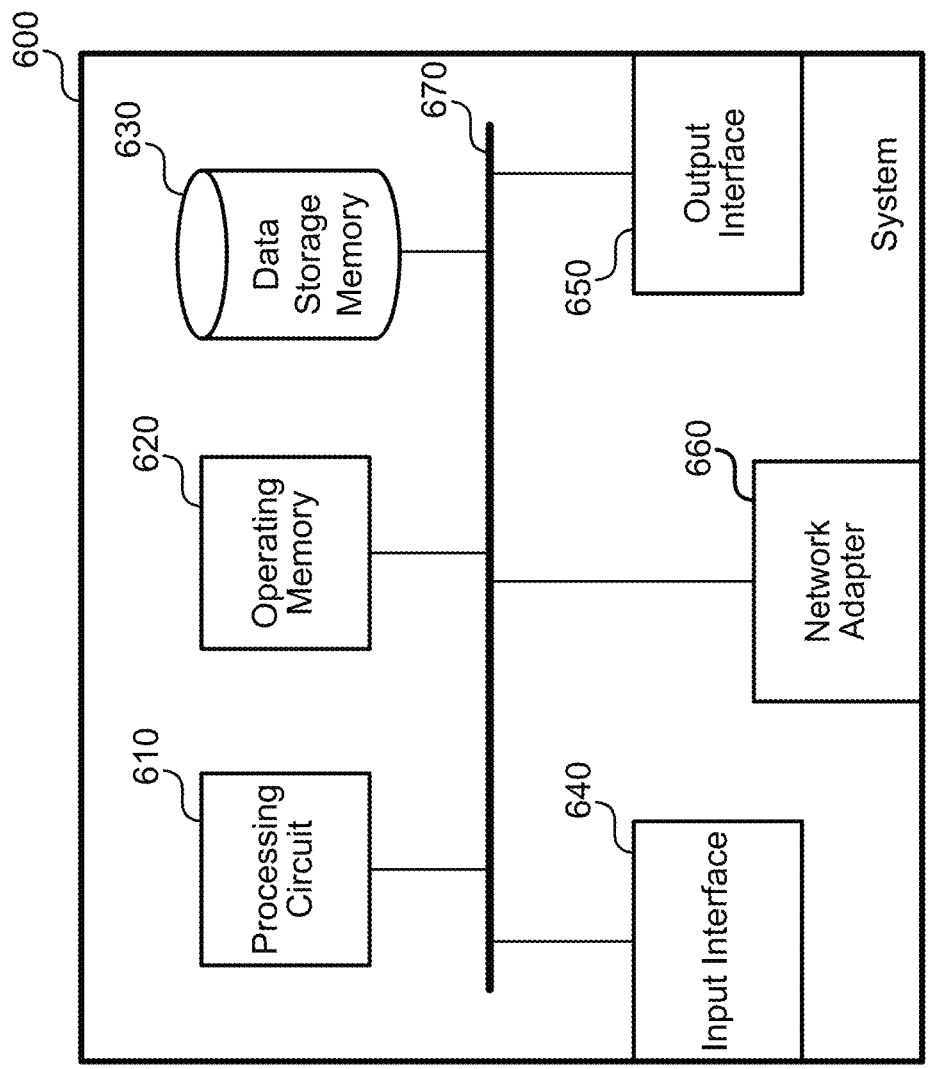
FIG. 6 is a block diagram illustrating example hardware components of a computing device, in accordance with aspects of the present disclosure.

FIG. 6 is a high-level illustration of example hardware components of computing device 600, which may be used to practice various aspects of the technology. For example, computing device 600 may be employed as one of the computing devices 110 of FIG. 1, one of the servers of the server rack load of FIG. 2, 3, or 4, and/or the like. As shown, computing device 600 includes processing circuit 610, operating memory 620, data storage memory 630, input interface 640, output interface 650, and network adapter 660. These aforementioned components may be interconnected by bus 670.

Computing device 600 may be virtually any type of general- or specific-purpose computing device. For example, computing device 600 may be a user device such as a desktop computer, a laptop computer, a tablet computer, a display device, a camera, a printer, or a smartphone. Likewise, computing device 600 may also be server device such as an application server computer, a virtual computing host computer, or a file server computer.

Computing device 600 includes processing circuit 610 which may be adapted to execute instructions, such as instructions for implementing the above-described processes or other technology. Processing circuit 610 may include a microprocessor and/or a microcontroller and may serve as a control circuit. The aforementioned instructions, along with other data (e.g., datasets, metadata, operating system instructions, etc.), may be stored in operating memory 620 and/or data storage memory 630.

In one example, operating memory 620 is employed for run-time data storage while data storage memory 630 is employed for long-term data storage. However, each of operating memory 620 and data storage memory 630 may be employed for either run-time or long-term data storage. Each of operating memory 620 and data storage memory 630 may also include any of a variety of data storage devices/components, such as volatile memories, semi-volatile memories, non-volatile memories, random access memories, static memories, disks, disk drives, caches, buffers, or any other media that can be used to store information. However, operating memory 620 and data storage memory 630 specifically do not include or encompass communications media, any communications medium, or any signals per se.

Also, computing device 600 may include or be coupled to any type of computer-readable media such as computer-readable storage media (e.g., operating memory 620 and data storage memory 630) and communication media (e.g., communication signals and radio waves). While the term computer-readable storage media includes operating memory 620 and data storage memory 630, this term specifically excludes and does not encompass communications media, any communications medium, or any signals per se.

Computing device 600 also includes input interface 640 and output interface 650. Input interface 640 may be adapted to enable computing device 600 to receive information from a power monitor, power supply, power source, and/or other information source. Such information may include an instantaneous power draw from a power source as well as any of the other information mentioned in this disclosure. Output interface 650 may be adapted to provide instructions to power supplies. For example, one such instruction is an instruction to a power supply to adjust a target DC output voltage. Output interface 650 may include a RS-232 interface, an I2C interface, a GPIB interface, and/or the like.

Computing device 600 also includes network adapter 660 which may be adapted to interface computing device 600 to a network such as network 106. Network adapter 660 may include a network interface card (NIC), a media access control (MAC) interface, a physical level interface (PHY), and/or the like. Network adapter 660 may also serve as an input and/or output interface for computing device 600.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a first power train including a first plurality of components, wherein the first power train is configured to provide power to a first plurality of server racks of a first data center at a first level of high-availability service associated with a first uptime availability, and wherein the first plurality of components includes a first subset of the first plurality of components and a second subset of the first plurality of components; and
a second power train a including second plurality of components, wherein the second power train is configured to provide power to a second plurality of server racks of the first data center at a second level of high-availability service that is associated with a second uptime availability, wherein the first uptime availability is greater than the second uptime availability, wherein the second plurality of components includes a first subset of the second plurality of components and a second subset of the second plurality of components, and wherein the second subset of the first plurality of components is the second subset of the second plurality of components.

2. The apparatus of claim 1, wherein the first power train includes distributed redundancy, and wherein the second power train is powered by one power source only.

3. The apparatus of claim 1, wherein the first power train includes two power distribution units and two busways for providing power to the first plurality of server racks in a dual corded topology, and wherein the second power train includes one power distribution unit and one busway for providing power to the second plurality of servers in a single corded topology.

4. The apparatus of claim 1, wherein the second subset of the first plurality of components includes a plurality of uninterruptible power supplies.

5. The apparatus of claim 1, wherein the second subset of the first plurality of components includes a plurality of static switches that are configured to provide an alternate source of power via an alternate busway.

6. The apparatus of claim 1, further comprising a control component that is configured to provide power to a third plurality of server racks based a selection between a plurality of power trains including the first power train and the second power train.

7. The apparatus of claim 6, wherein the selection is a dynamic selection.

8. The apparatus of claim 1, wherein the second subset of the first plurality of components includes a plurality of static switches that are configured to provide an alternate source of power via at least two alternate busways.

9. The apparatus of claim 8, the apparatus further comprising a plurality of cells including a first cell and a second cell, each cell of the plurality of cells having at least two power trains and at least two power distribution units, wherein a first of the at least two alternate busways is a busway to the first cell, and wherein a second of the at least two alternate busways is a busway to the second cell.

10. The apparatus of claim 1, wherein the first power train includes a backup generator and control for transferring the first plurality of server racks to be powered by the backup generator responsive to detection of a failure, and wherein the second power train is configured to be powered by utility power only.

11. The apparatus of claim 10, wherein the first power train is powered based on a capacity of the backup generator, and wherein the second power train is powered based on a difference between a capacity of the utility power and the capacity of the backup generator.

12. The apparatus of claim 1, wherein the first uptime availability is a first uptime service level agreement, the second uptime availability is a second uptime level of service level agreement, and wherein the first uptime service level agreement is greater than the second uptime level service agreement.

13. A method, comprising:
employing a first power train to provide power to a first plurality of server racks of a first data center at a first level of high-availability service associated with a first availability of uptime, wherein a first power train includes a first plurality of components, and wherein the first plurality of components includes a first subset of the first plurality of components and a second subset of the first plurality of components;
employing a second power train to provide power to a second plurality of server racks of the first data center at a second level of high-availability service that is associated with a second availability of uptime, wherein the second power train includes a second plurality of components, wherein the first availability of uptime is greater than the second availability of uptime, wherein the second plurality of components includes a first subset of the second plurality of components and a second subset of the second plurality of components, and wherein the second subset of the first plurality of components is the second subset of the second plurality of components.

14. The method of claim 13, further comprising powering at least one server rack based a selection between a plurality of power trains including the first power train and the second power train.

15. The method of claim 13, further comprising transferring the first plurality of server racks to be powered by a backup generator of the first power train responsive to detection of a failure, wherein powering the second power train is accomplished by utility power only.

16. The method of claim 15, wherein powering the first plurality of server racks is based on a capacity of the backup generator, and wherein powering the second plurality of server racks is based on a difference between a capacity of the utility power and the capacity of the backup generator.

17. An apparatus, comprising:
a first data center including a plurality of topologies, wherein the plurality of topologies includes:
a first topology that is configured to provide power suitable for powering server loads in accordance with a first availability; and
a second topology that is configured to provide power suitable for powering server loads in accordance with a second availability that is different than the first availability, wherein the second topology shares some components in common with the first topology.

18. The apparatus of claim 17, wherein the first data center is configured to provide power to at least one server load based on a selection from among the plurality of topologies.

19. The apparatus of claim 17, wherein the first topology includes a backup generator and control for transferring loads powered by the first topology to the backup generator responsive to detection of a failure, and wherein the second topology is configured to provide power based on utility power only.

20. The apparatus of claim 19, wherein the first topology is arranged to provide power based on a capacity of the backup generator, and wherein the second topology is arranged to provide power based on a difference between a capacity of the utility power and the capacity of the backup generator.

* * * * *